US009386139B2

(12) United States Patent
Knight

(10) Patent No.: US 9,386,139 B2
(45) Date of Patent: Jul. 5, 2016

(54) METHOD AND APPARATUS FOR PROVIDING AN EMOTION-BASED USER INTERFACE

(75) Inventor: Paul Antony Knight, Farnborough (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 509 days.

(21) Appl. No.: 12/408,610

(22) Filed: Mar. 20, 2009

(65) Prior Publication Data

US 2010/0240416 A1    Sep. 23, 2010

(51) Int. Cl.
*H04M 3/00* (2006.01)
*H04M 1/725* (2006.01)
*G06F 3/0482* (2013.01)

(52) U.S. Cl.
CPC ......... *H04M 1/72522* (2013.01); *G06F 3/0482* (2013.01); *G06F 2203/011* (2013.01); *H04M 1/72544* (2013.01)

(58) Field of Classification Search
None
See application file for complete search history.

(56) References Cited

U.S. PATENT DOCUMENTS

| | | | |
|---|---|---|---|
| 6,990,452 B1 | 1/2006 | Ostermann et al. | |
| 7,096,431 B2 | 8/2006 | Tambata et al. | |
| 7,360,151 B1 | 4/2008 | Froloff | |
| 7,522,912 B2 | 4/2009 | Seo et al. | |
| 7,586,031 B1* | 9/2009 | Baker | 84/609 |
| 2002/0082007 A1 | 6/2002 | Hoisko et al. | |
| 2006/0015560 A1 | 1/2006 | MacAuley et al. | |
| 2006/0015812 A1 | 1/2006 | Cunningham et al. | |
| 2006/0293787 A1 | 12/2006 | Kanda et al. | |
| 2007/0054678 A1* | 3/2007 | Doulton | 455/466 |
| 2007/0288478 A1 | 12/2007 | DiMaria et al. | |
| 2008/0074443 A1 | 3/2008 | Taniguchi et al. | |
| 2008/0216022 A1 | 9/2008 | Lorch et al. | |
| 2008/0245211 A1 | 10/2008 | Lemons | |
| 2009/0056525 A1* | 3/2009 | Oppenheimber | 84/609 |
| 2010/0011388 A1* | 1/2010 | Bull et al. | 725/9 |

FOREIGN PATENT DOCUMENTS

| | | |
|---|---|---|
| CN | 101370195 A | 2/2009 |
| EP | 1 523 160 A1 | 4/2005 |
| GB | 2 376 379 A | 12/2002 |
| WO | WO 01/27879 A1 | 4/2001 |
| WO | WO 2004/017596 A1 | 2/2004 |
| WO | WO 2008/039031 A1 | 4/2008 |

OTHER PUBLICATIONS

International Search Report and Written Opinion for corresponding International App. No. PCT/FI2010/050027 dated May 19, 2010, pp. 1-19.
Office Action for corresponding Chinese Application No. 201080012936.6, dated Dec. 24, 2013, 6 pages, with English language summary.
Notification of the First Office Action for Chinese Application No. 201080012936.6, dated Apr. 1, 2013, pp. 1-16.
Office Action for corresponding Chinese Application No. 201080012936.6, dated Sep. 15, 2014 (Partial English Translation and Summary Included).

* cited by examiner

*Primary Examiner* — Suhail Khan
(74) *Attorney, Agent, or Firm* — Ditthavong & Steiner, P.C.

(57) ABSTRACT

An approach is provided for accessing services, applications, and content using an emotion-based user interface. Descriptors corresponding to an emotion of the user are presented to the user for selection. Selection of one of the descriptors initiates presentation of options (e.g., actions for accessing service, applications, or content available to a user device) associated with the descriptor.

19 Claims, 15 Drawing Sheets

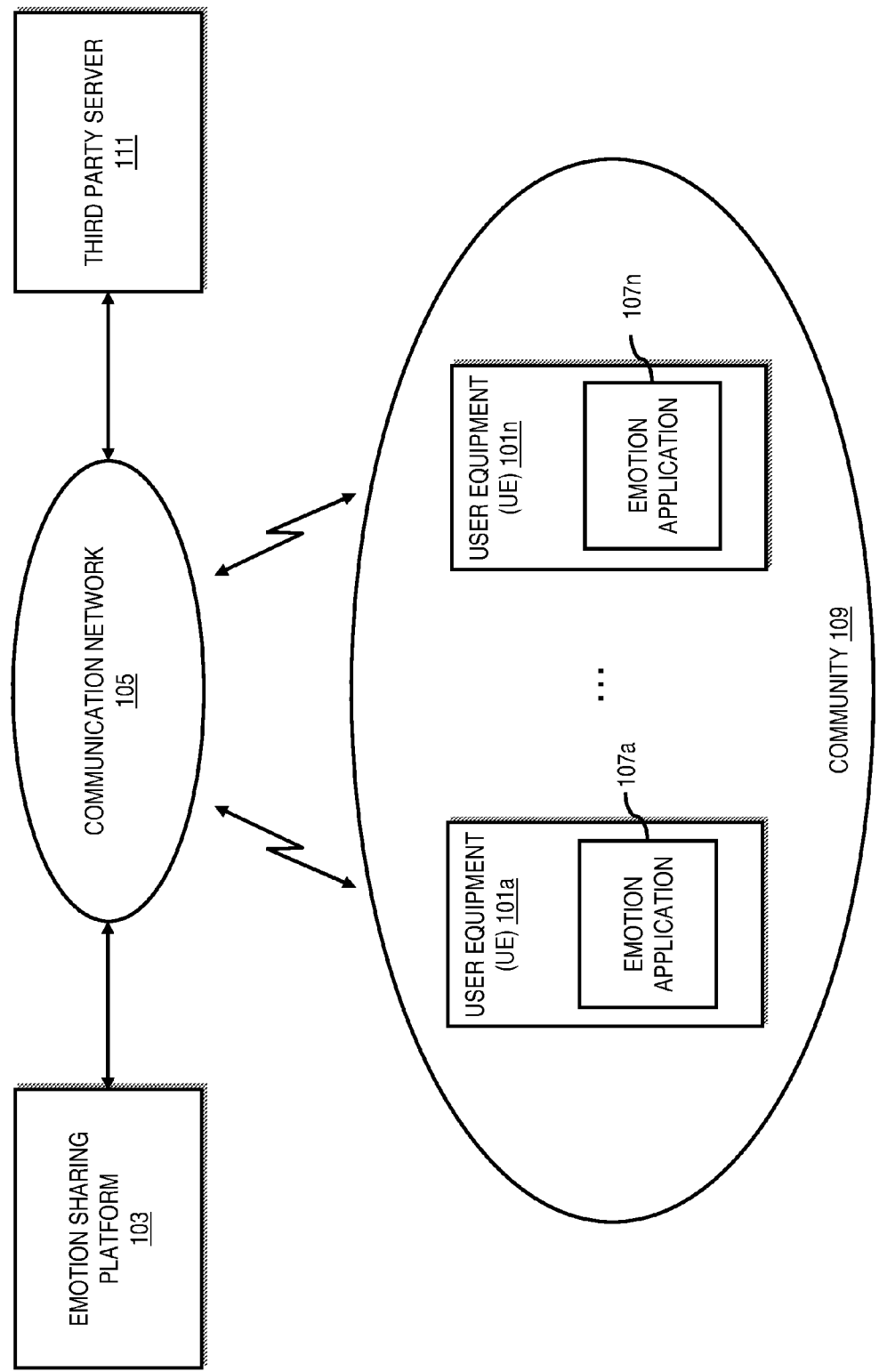

METHOD AND APPARATUS FOR PROVIDING AN EMOTION-BASED USER INTERFACE

BACKGROUND

Wireless (e.g., cellular) service providers and device manufacturers are continually challenged to deliver value and convenience to consumers by, for example, providing compelling network services, applications, and content. The increase in the number of available features, however, can also make it difficult for a user to discover the services, applications, and content of specific interest to the user. Traditionally, users may have to cull through potentially hundreds or even thousands of services, applications, and content to find one of interest. As a result, users may find it too difficult to find specific features or simply do not understand the method by which the users can achieve what they need a particular device to do.

SOME EXEMPLARY EMBODIMENTS

Therefore, there is a need for an approach for providing a user interface to efficiently discover and use services, applications, and content.

According to one embodiment, a computer-readable medium carries one or more sequences of one or more instructions which, when executed by one or more processors, cause the one or more processors to initiate presentation of a plurality of descriptors to a user. Each of the descriptors includes information corresponding to an emotion of the user. The one or more processors are also caused to initiate presentation of one or more options associated with a selected one of the descriptors. The one or more processors are further caused to invoke an application corresponding to a selected one of the options.

According to another embodiment, an apparatus comprises a processor and a memory storing executable instructions that if executed cause the apparatus to initiate presentation of a plurality of descriptors to a user. Each of the descriptors includes information corresponding to an emotion of the user. The apparatus is also cause to initiate presentation of one or more options associated with a selected one of the descriptors. The apparatus is further caused to invoke an application corresponding to a selected one of the options.

According to another embodiment, a method comprises providing access for creating a community of users and for sharing one or more descriptors and associated options within the community.

According to yet another embodiment, an apparatus comprises a processor and a memory storing executable instructions that if executed cause the apparatus to receive input, from a user, for creating or joining a community of users. The apparatus is also caused to initiate creation of the community or addition of the user to the community based on the input. The apparatus is further caused to initiate sharing of one or more descriptors and associated options within the community.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a communication system capable of providing an emotion-based user interface, according to an exemplary embodiment;

DESCRIPTION OF PREFERRED EMBODIMENT

A method and apparatus for providing an emotion-based user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "emotion" refers to a mood, need, or feeling (e.g., bored, hungry, sporty, lost, etc.) associated with a user. The term "descriptor," as used herein, refers to an identifier representing an emotion. In addition, the term "option," as used herein, refers to accessing any of the services, applications, content, or a combination thereof available on a user equipment. Although various exemplary embodiments are described with respect to providing an emotion-based user interface within a wireless network environment, it is contemplated that the approach described herein may be used within any type of communication system or network.

Figure 1B:
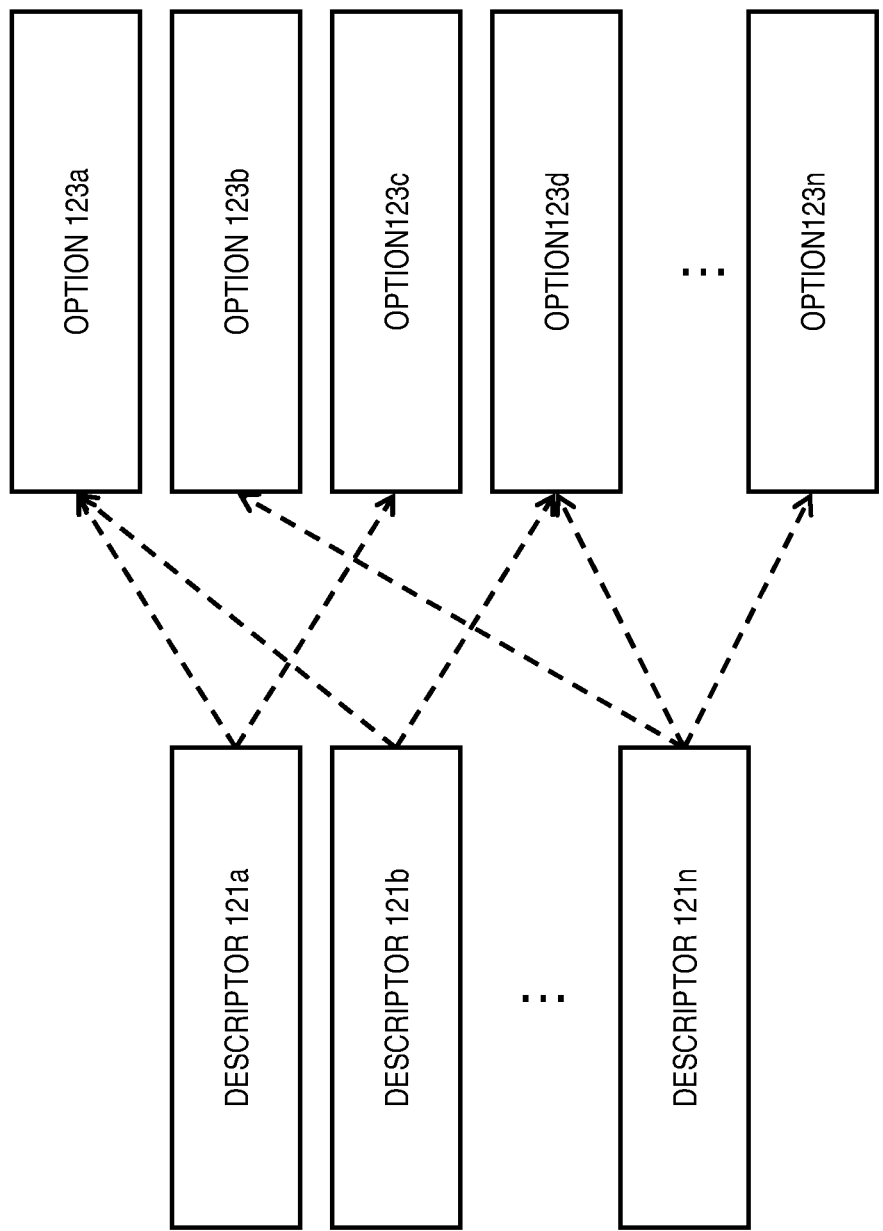
FIG. 1B is a diagram depicting the relationship between descriptors of emotion and associated options, according to an exemplary embodiment.

FIG. 1A is a diagram of a communication system capable of providing an emotion-based user interface, according to an exemplary embodiment. FIG. 1A is described with respect to FIG. 1B depicting the relationship between descriptors of emotion and associated options, according to an exemplary embodiment. As shown in FIG. 1A, a system 100 comprises one or more user equipment (UEs) (e.g., UEs 101a-101n) having connectivity to an emotion sharing platform 103 via a communication network 105. The UEs 101a-101n are any type of mobile terminal, fixed terminal, or portable terminal including mobile handsets, stations, units, devices, multimedia tablets, Internet nodes, communicators, desktop computers, laptop computers, Personal Digital Assistants (PDAs), or any combination thereof. It is also contemplated that the UEs 101a-101n can support any type of interface to the user (such as "wearable" circuitry, etc.). In exemplary embodiments, the UEs 101a-101n each includes an emotion application 107 for providing an emotion-based user interface.

More specifically, the emotion application 107 enables the user to discover and perform options (e.g., use services, applications, and content) available on the UE 101 based on a descriptor associated with the user. In exemplary embodiments, the descriptor includes information corresponding to an emotion (e.g., bored, hungry, lost) of the user. Each descriptor is associated with one or more options to invoke services, applications, and/or content appropriate for the emotion. FIG. 1B is a diagram depicting the relationship between descriptors of emotion and associated options, according to an exemplary embodiment. As shown, descriptors 121a-121n may be associated with any number of options 123a-123n. For example, descriptor 121a is associated with options 123a and 123c; descriptor 121b is associated with option 123a and 123d; and descriptor 121n is associated with options 123b, 123d, and 123n. It is noted that an option 123 may be associated with more than one descriptor 121 (e.g., in cases where an option is appropriate for more than one emotion). By way of example, a descriptor 121 for the "lost" emotion may be associated with an option 123 to obtain directions home or an option 123 to display a map. In exemplary embodiments, selecting a descriptor 121 associated with an emotion enables the application 107 to initiate presentation of options 123 associated with the descriptor for selection by the user.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

As discussed previously, it often can be difficult for a user to discover and use features (e.g., services, applications, and content) available on the UE 101 and the communication network 105, particularly when the library of available features available is large or the user is otherwise unfamiliar or unaware of the features. As a result, potentially useful or helpful features of the network 105 may remain under utilized. The system 100 addresses this problem by providing a user interface to access, for instance, the services, applications, and content available over the communication network 105 using a descriptor 121 including an emotion (e.g., needs or moods such as being bored, hungry, or lost) that is familiar to most users. The system 100, for example, initiates presentation of various descriptors 121 representing possible emotions for selection by the user. In this way, the emotion application 107 within the UE 101 can automatically suggest options 123 for accessing services, applications, and/or content available to the UE 101 that are appropriate to the emotion (e.g., bored, lost, hungry) represented by the descriptor 121.

In exemplary embodiments, the emotion application 107 also enables the user to customize existing or predetermined descriptors 121 by adding or deleting options 123 associated with the emotion. Additionally, the user can create entirely new descriptors 121 and specify the options 123 to be associated with the new descriptor 121. As shown in FIG. 1A, the UEs 101a-101n can be organized into one or more communities 109 for sharing descriptors 121 and associated options 123 via, for example, social networking protocols. Sharing descriptors 121 and associated options 123 within a community 109, for instance, enables the user to leverage the descriptors 121 and options 123 created by friends and associates. The UEs 101a-101n may also obtain additional descriptors 121 and associated options 123 by downloading them from a network 105 server (e.g., emotion sharing platform 103) or a third party server 111 with connectivity over the communication network 105. Through community sharing and downloading, the user can easily discover and use new features and functions of both the UE 101 and the communication network 105.

By way of example, the UE 101 communicate with the emotion sharing platform 103 and other members of the community 109 over the communication network 105 using standard protocols. The UEs 101a-101n and the emotion sharing platform 103 are network nodes with respect to the communication network 105. In this context, a protocol includes a set of rules defining how the network nodes within the communication network 105 interact with each other based on information sent over the communication links. For instance, members of the community 109 may communicate using a social networking protocol. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
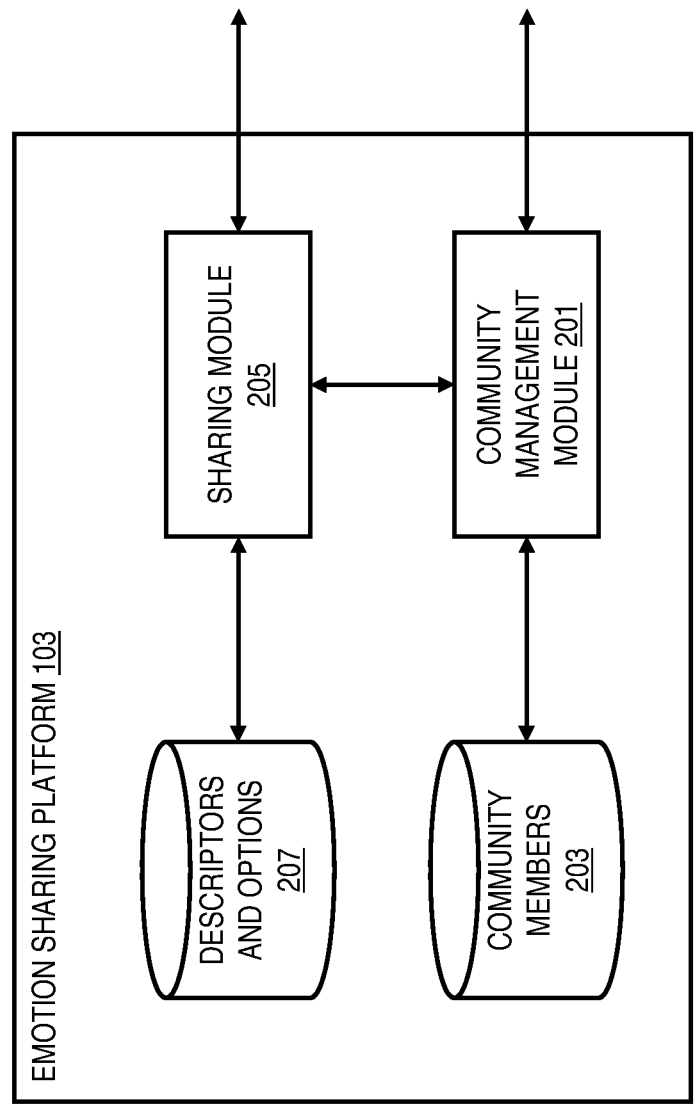
FIG. 2 is a diagram of components of an emotion sharing platform, according to an exemplary embodiment.

FIG. 2 is a diagram of components of an emotion sharing platform, according to an exemplary embodiment. By way of example, the emotion sharing platform 103 includes one or more components for sharing descriptors 121 and their associated options 123 within a community 109. It is contemplated that the functions of these components may be combined in one or more components or performed by other components of equivalent functionality. In this embodiment, the emotion sharing platform 103 includes a community management module 201 for creating and maintaining a community 109 for sharing descriptors 121 and associated options 123 among the members of the community 109. By way of example, management functions of the module 201 include creating a new community 109 and updating membership to the community 109. To assist in managing the community 109, the community management module 201 has connectivity to a database 203 of community members. The database 203 of community members, for instance, stores information to identify one or more communities 109 and their members.

The community management module 201 also interacts with a sharing module 205 to manage the sharing of descriptors 121 and associated options 123 of the community 109 among members of the community 109. In exemplary embodiments, the community management module authenticates members of the community 109 before permitting the sharing of the descriptors 121 and associated options 123. It is contemplated that the community management module 201 can use any authentication mechanism (e.g., user ID/password, device ID filtering, etc.) to ensure that only authorized members access the community 109. After authentication, the sharing module 205, for instance, responds to requests from community members for both uploading and downloading of descriptors 121 and associated options 123 between members of the community 109.

As shown in FIG. 2, the sharing module 205 has connectivity to a database 207 of descriptors 121 and associated options 123. In exemplary embodiments, the sharing module 205 stores shared descriptors 121 and options 123 in the database 207 for distribution among members of the community 109. In certain embodiments, the sharing module 205 can also operate in a peer-to-peer mode whereby the descriptors 121 and associated options 123 are transferred directly between members of the community 109.

Figure 3:
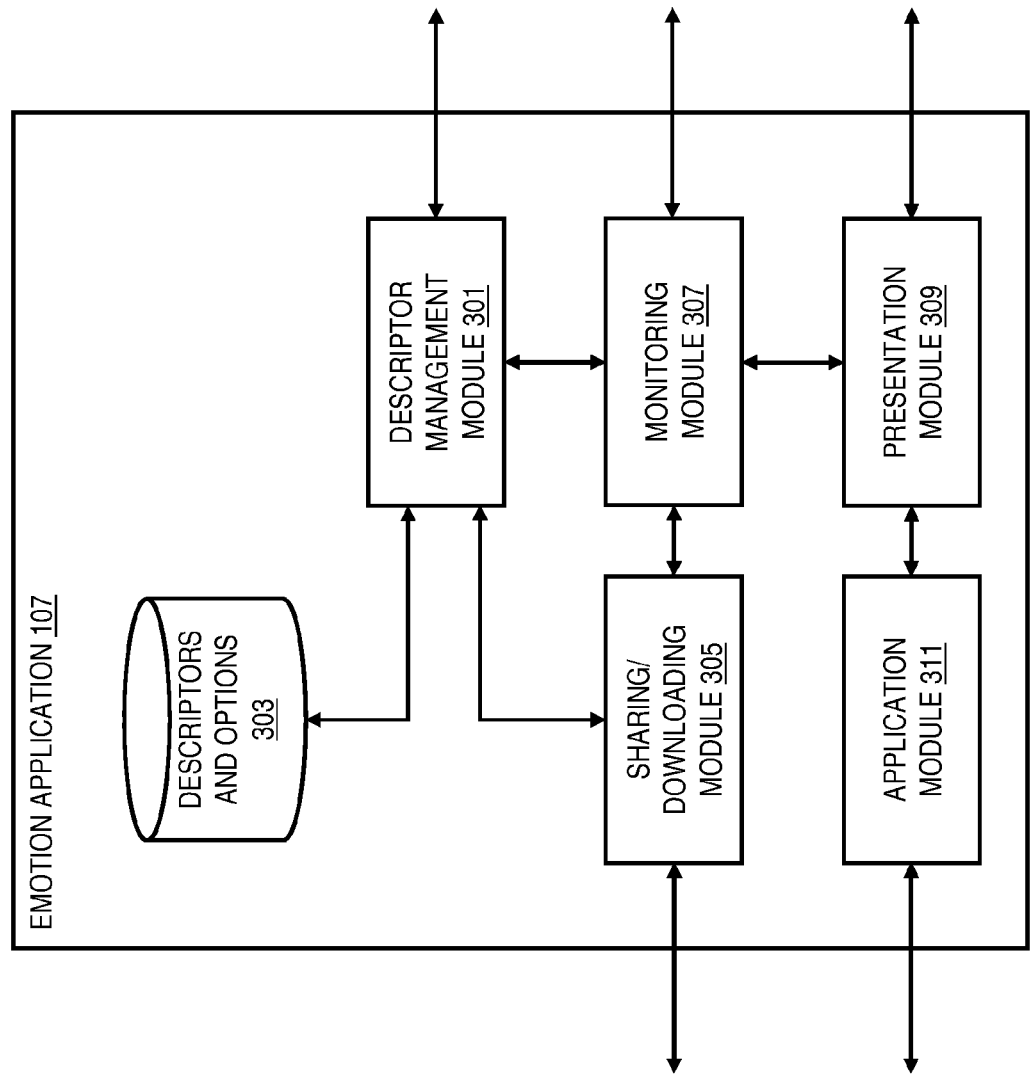
FIG. 3 is a diagram of components of an emotion application, according to an exemplary embodiment.

FIG. 3 is a diagram of components of an emotion application, according to an exemplary embodiment. By way of example, the emotion application 107 includes one or more components for creating or updating a descriptor 121 and associated options 123, initiating presentation of descriptors 121, initiating presentation of options 123 associated with a selected descriptor 121, and invoking an application corresponding to a selected option 123. It is contemplated that the functions of these components may be combined in one or more components or performed by other components of equivalent functionality. In exemplary embodiments, the emotion application 107 includes an descriptor management module 301 for creating or updating a descriptor 121 and associated options 123.

To create a new descriptor 121 and associated options 123, the descriptor management module 301, for instance, receives an input from a user for defining the new descriptor 121. The user can then designate the default options 123 (e.g., actions involving services, applications, or content available to the UE 101) available when a user selects the descriptor 121. Alternatively, the descriptor management module can learn specific options 123 associated with the new descriptor 121 by monitoring the activities of the user on the UE 101 when the new descriptor 121 is selected. For example, the user creates a new descriptor 121 and then begins selecting or invoking the services, applications, or content that should be associated with the new descriptor 121. The descriptor management module 301 monitors the selected or invoked services, applications, or content and designates them as associated options 123. The new descriptor 121 and associated options 123 are stored in, for instance, the database 303 of descriptors and options.

Similarly, to update an existing descriptor 121 (including, e.g., predetermined descriptors 121 and associated options 123), the descriptor management module 301 can either explicitly input the changes (e.g., add or delete options associated with the emotion) or learn the changes by monitoring the activities of the user on the UE 101, for instance, when the descriptor 121 to be updated is selected. For example, to update an existing descriptor 121 by learning, the user selects the descriptor 121 to be updated and then begins selecting or invoking the services, applications, or content to be associated with the updated descriptor 121. The descriptor management module 301 monitors the selected or invoked services, applications, or content and updates the descriptor 121 accordingly. The updated descriptor 121 is then stored in the database 303 of descriptors and options. In exemplary embodiments, the descriptor management module 301 interacts with a sharing/downloading module 305 to share the newly created or updated descriptor 121 and associated options 123 within a community of users.

As shown in FIG. 3, the emotion application 107 also includes determination monitoring module 307 for receiving an input from the user for selecting a specific descriptor 121 or for monitoring the user's actions on the UE 101 to determine which of the multiple of available descriptors 121 to present to the user. In the first case, the user may directly select a descriptor 121 by, for instance, making a menu selection corresponding to the descriptor 121. The monitoring module 307 can also determine which descriptors 121 to present to the user by monitoring the user's actions. For example, the monitoring module 307 may present a descriptor 121 representing the emotion of "lost" if activity monitoring demonstrates that the user is consulting multiple navigation services, applications, or content. In exemplary embodiments the monitoring module 307 may interact with the descriptor management module 301 and the database 303 of descriptors and options to identify the descriptors 121 to present to the user by, for instance, comparing the user's monitored activities against the options 123 associated with the descriptors 121 stored in the database 303. For example, a match with a descriptor 121 may be determined if the monitored activities match the activities corresponding to the options 123 associated with the descriptor 121. If the monitoring module 307 is unable to match the user's activities against any of the descriptors 121 stored in the database 303, the monitoring module 307 can interact with the sharing/downloading module 305 to download additional descriptors 121 and associated options 123 from the emotion sharing platform 103, the community 109 of users, or a third party server 111.

The monitoring module 307 interacts with the presentation module 309 to initiate presentation of the options associated with the descriptor 121 selected by the user. The user can then select one of the options 123 to invoke an application associated with the selected options 123. In exemplary embodiments, the application module 311 triggers the initiation of the application corresponding to the selected option 123. By way of example, the selected option 123 may invoke an application to access services, applications, or content available to the UE 101 including games, media content, personal information management applications (e.g., calendar, contacts), messaging applications (e.g., instant messaging, text messaging, E-mail), social networking applications (e.g., Twitter®, Facebook®), location-aware applications (e.g., global positioning satellite (GPS) enabled applications), or any combination thereof.

Figure 4:
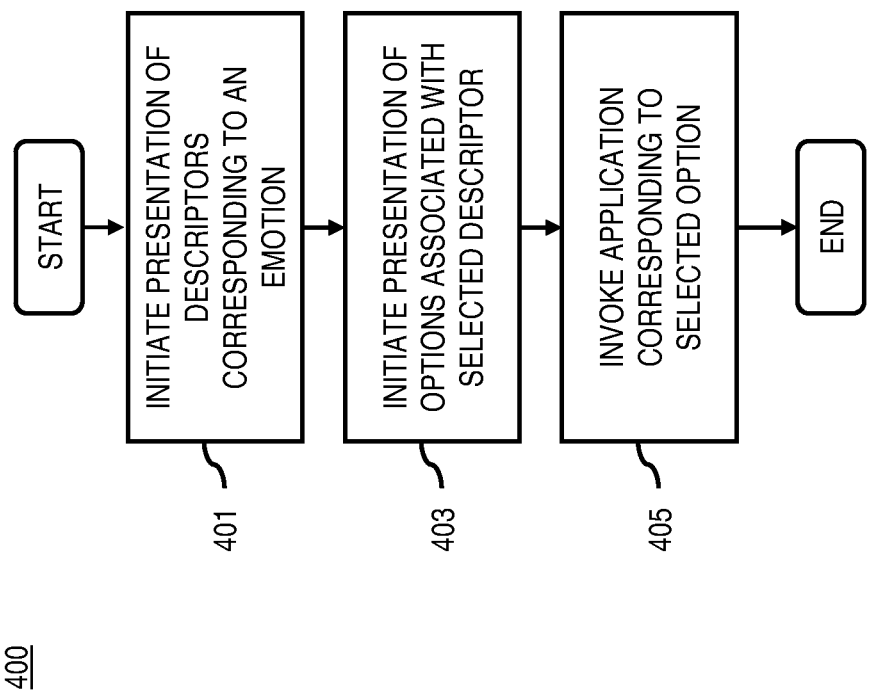
FIG. 4 is a flowchart of a process for providing an emotion-based user interface, according to an exemplary embodiment.
Figure 10:
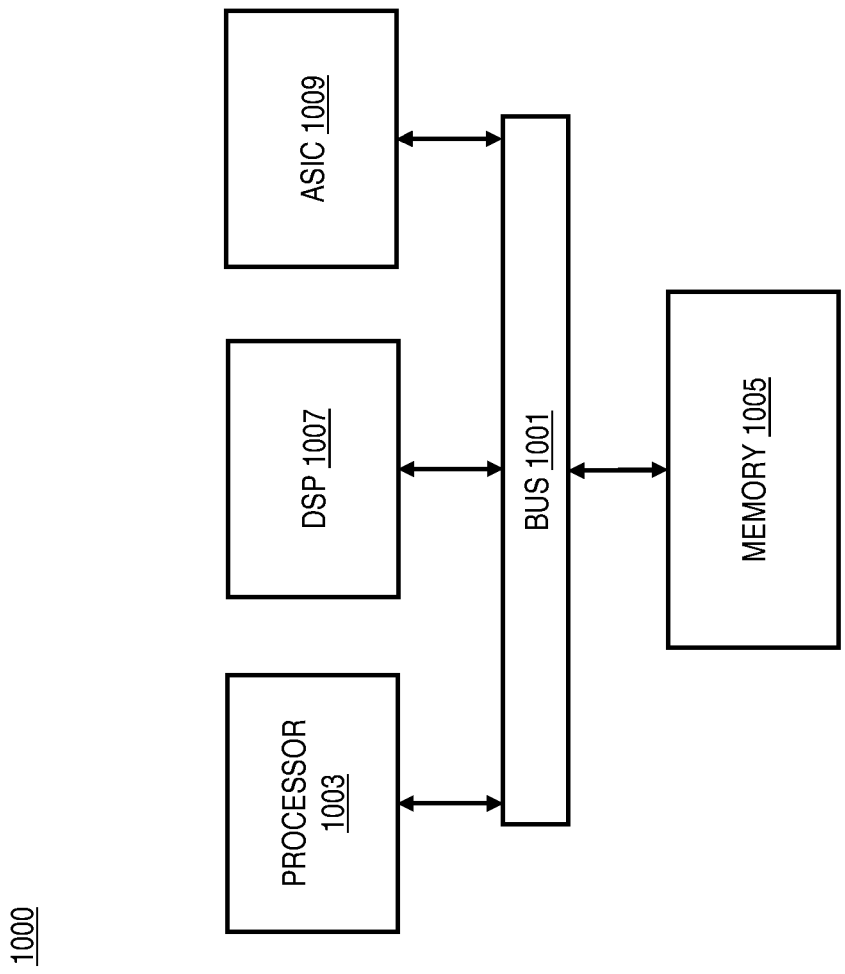
FIG. 10 is a diagram of a chip set that can be used to implement an embodiment of the invention.

FIG. 4 is a flowchart of a process for providing an emotion-based user interface, according to an exemplary embodiment. In one embodiment, the emotion application 107 performs the process 400 and is implemented in, for instance, a chip set including a processor and a memory as shown in FIG. 10. In step 401, the emotion application 107 initiates presentation of descriptors that include information corresponding to an emotion of the user. In exemplary embodiments, the descriptors 121 are presented on the UE 101 in the form of menu selections (see discussion with respect to FIGS. 7A-7D for a description of the user interface). It is contemplated that the descriptors 121 may also be presented in using any mechanism available on the UE 101 including text, audio prompts, icons, video, etc. As discussed with respect to FIG. 3, the emotion application 107 can monitor the user's actions to determine which descriptors 121 to present to the user. After the user selects a descriptor 121 representing a desired emotion, the emotion application 107 initiates presentation of the options 123 associated with the descriptor 121 to the user (step 403). The options 123, for instance, include actions to access services, applications, or content (e.g., games, media content, personal information management applications, messaging applications, social networking applications, location-aware applications) that are appropriate for the emotion represented by the descriptor 121. For example, if the selected descriptor 121 corresponds to the emotion of being "hungry," the emotion application 107 can present the option 123 to locate the nearest restaurant or the option 123 to find a recipe on the Internet. After the user selects and option 123, the emotion application 107 invokes the application corresponding to the selected option (step 405). By presenting various options 123 based on the user's emotion, the emotion application 107 enables the user to efficiently discover and use features of the UE 101 and the network 105 to satisfy the specific emotional need or mood represented by the descriptor 121.

Figure 5:
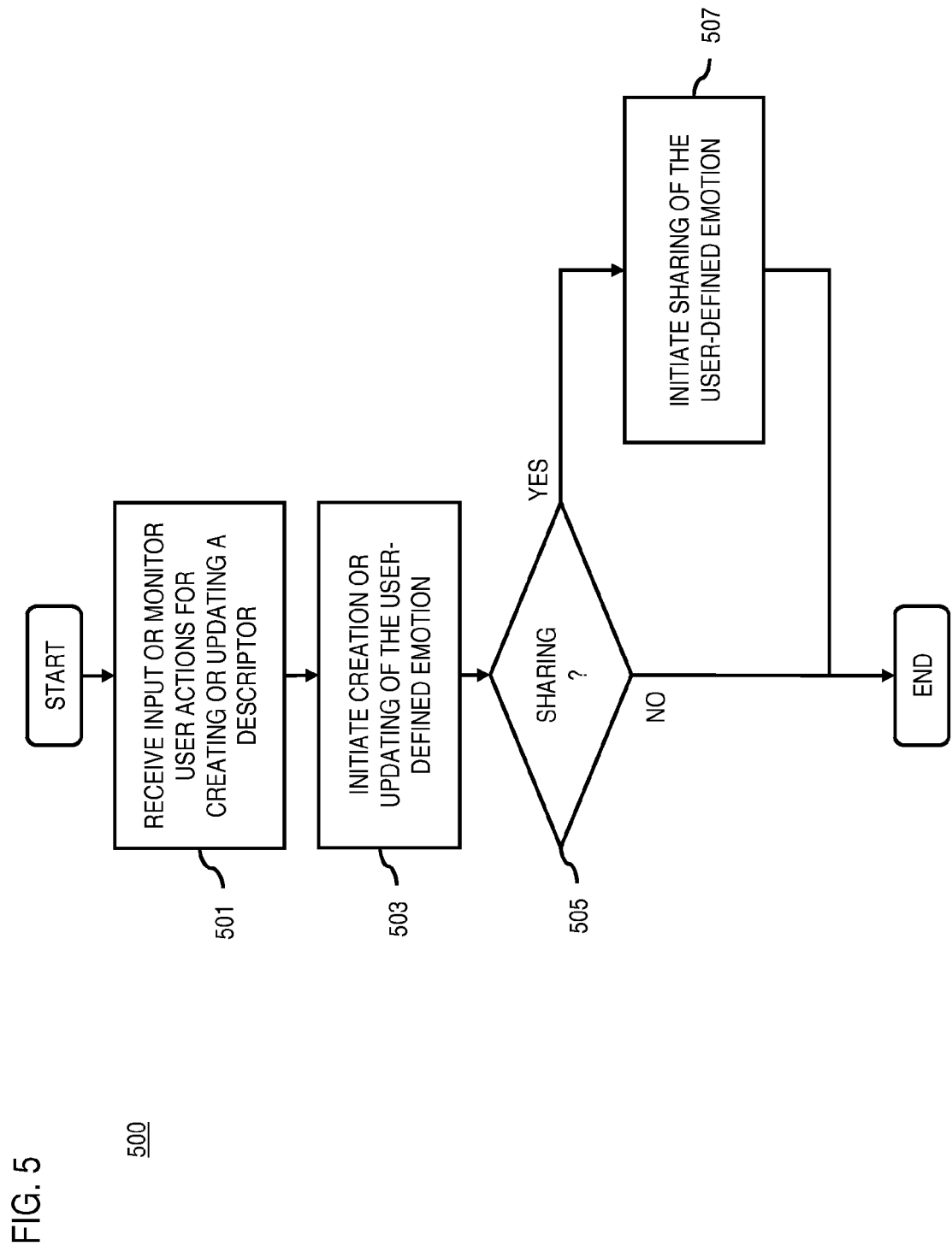
FIG. 5 is a flowchart of a process for creating or updating a descriptor and associated options, according to an exemplary embodiment.

FIG. 5 is a flowchart of a process for creating or updating a descriptor and associated options, according to an exemplary embodiment. In one embodiment, the emotion application 107 performs the process 500 and is implemented in, for instance, a chip set including a processor and a memory as shown in FIG. 10. In step 501, the emotion application 107 receives input for creating or updating a descriptor 121 and associated options 123. As discussed with respect to FIG. 3, the emotion application 107 can also create or update a descriptor 121 and associated options 123 by monitoring the user's actions on the UE 101. The emotion application then initiates creation or update of the descriptor 121 and associated options 123 (step 503). The step of creating or updating a descriptor 121 and associated options 123 includes, for instance, storing the newly created or updated descriptor 121 and associated options 123 in local storage (e.g., database 303 of descriptors and options). If the emotion application 107 is configured for sharing (step 505), the emotion application 107 also initiates the sharing of the newly created or updated descriptor 121 and associated options 123 (step 507). For instance, the emotion application 107 may upload the newly created or updated descriptor 121 and associated options 123 to the emotion sharing platform 103 for distribution with the community 109. Alternatively, the emotion application 107 may receive direct peer-to-peer requests to transfer the newly created descriptor 121 and associated options 123 to other members of the community 109.

Figure 6:
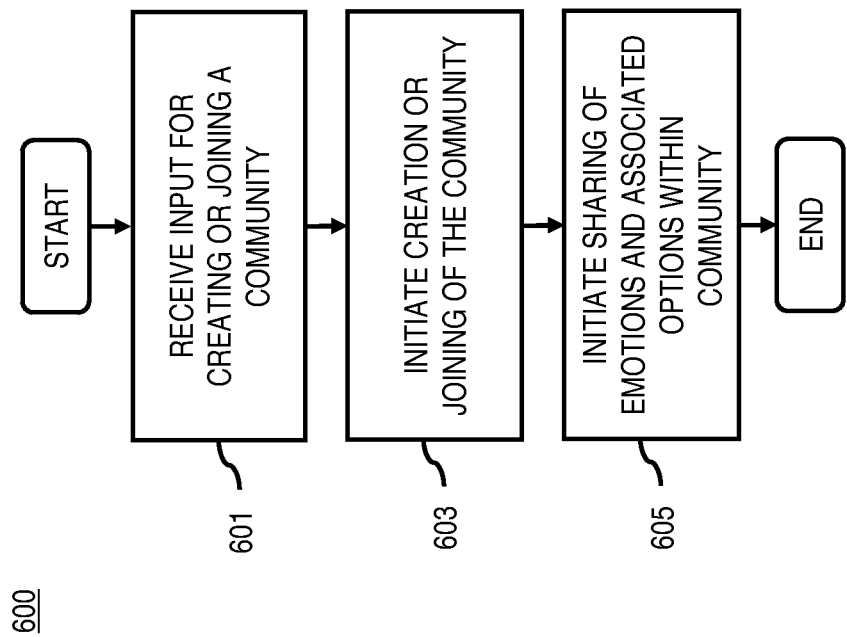
FIG. 6 is a flowchart of a process for creating or joining a community for sharing descriptors and associated options, according to an exemplary embodiment.

FIG. 6 is a flowchart of a process for creating or joining a community for sharing descriptors and associated options, according to an exemplary embodiment. In one embodiment, the emotion sharing platform 103 performs the process 600 and is implement in, for instance, a chip set including a processor and a memory as shown in FIG. 10. In step 601, the emotion sharing platform 103 receives an input, from a user, for creating or joining a community 109 of users. On receipt of the request, the emotion sharing platform 103 initiates creation of the community 109 or addition of the user to an existing community 109 based on the input (step 603). If the input is for creating a new community 109, the input may also include membership policies and rules for joining the community 109. By way of example, these policies and rules may specify security settings (e.g., authentication requirements), membership approval requirements (e.g., community administrator must approve new members), etc. If the input is for adding the user to an existing community 109, the emotion sharing platform 103 may enforce any applicable community policies and rules for adding the user.

After creating a new community 109 or adding the user to an existing community 109, the emotion sharing platform 103 initiates sharing of the descriptors 121 and associated options 123 of that belong to members of the community 109 among the members (step 605). As discussed with respect to FIG. 2, the emotion sharing platform 103 may initiate sharing of descriptors 121 and associated options 123 by storing the descriptors 121 and associated options 123 in the platform 103 itself and distributing the descriptors 121 and associated options 123 to members of the community 109 (i.e., acting a central distribution point for the emotions and associated options) or by operating in a peer-to-peer mode whereby individual members of the community 109 exchange descriptors 121 and associated options 123 directly using, for instance, a peer-to-peer protocol.

Figure 7A:
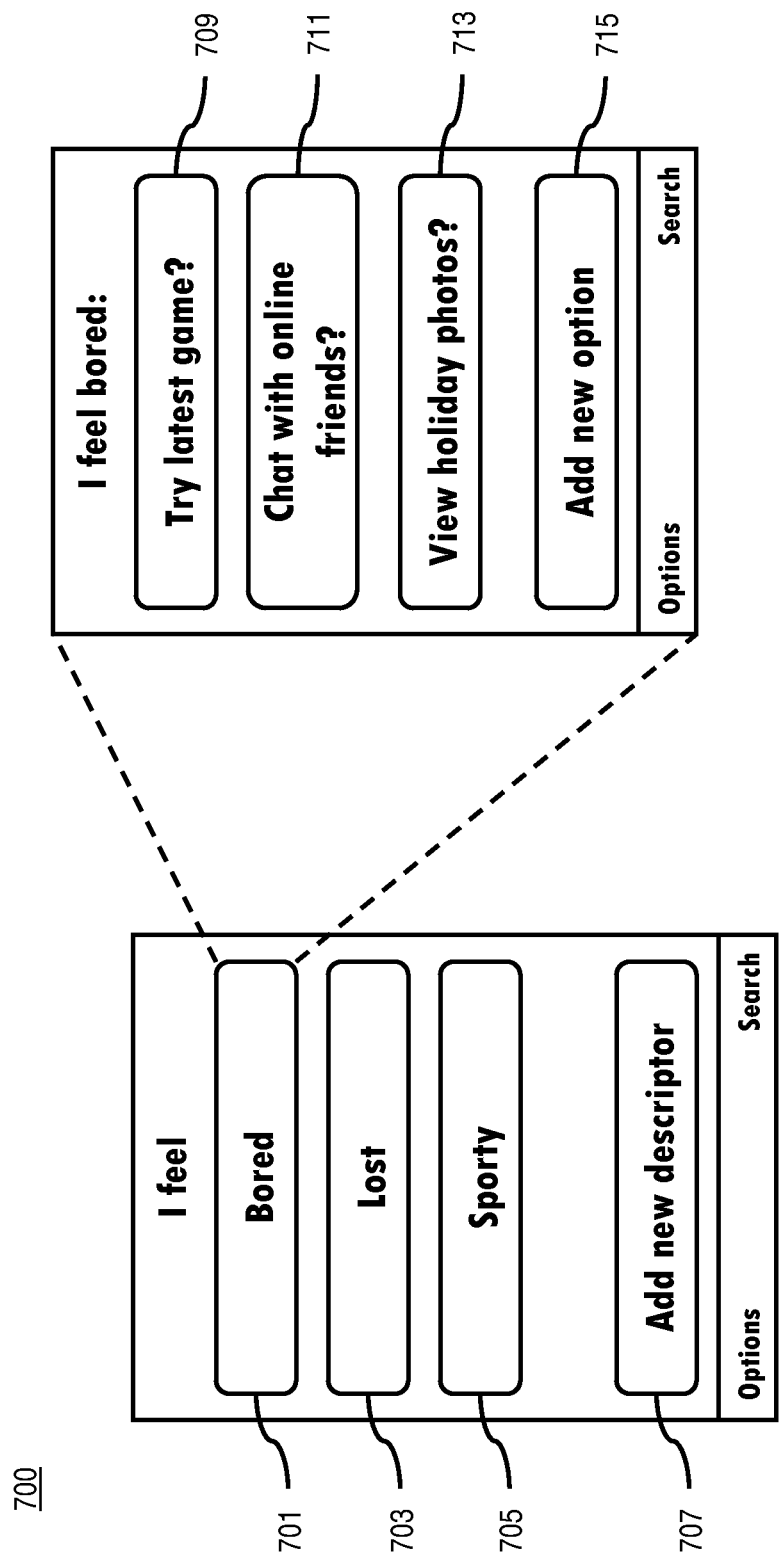
FIGS. 7A-7D are diagrams of an emotion-based user interface, according to an exemplary embodiment.

FIGS. 7A-7D are diagrams of an emotion-based user interface, according to an exemplary embodiment. FIG. 7A depicts a use-case scenario in which the user selects a descriptor 701 representing the emotion "bored." User interface 700 presents three descriptors: a descriptor 701 representing bored, a descriptor 703 representing lost, and a descriptor 705 representing sporty. The user interface also includes a menu selection 707 to add a new descriptor. In this example, the user selects the bored descriptor 701. On selecting the descriptor 701, the user is presented with a set of associated options. These options include option 709 to "Try latest game," option 711 to "Chat with online friends," option 713 to "View holiday photos," and option 715 to add a new option. Option 709 invokes, for example, the latest game available for download over the communication network 105. The invocation of the game may include downloading the game if the game is not already loaded in the UE 101 and starting the game. Option 711 invokes the chat application on the UE 101 to log the user into a chat session with any friends that are online. Option 713 invokes the photo viewing application to begin a slide of holiday photos. Option 715 enables the user to customize or specify a new option to associate with the bored descriptor 701.

Figure 7B:
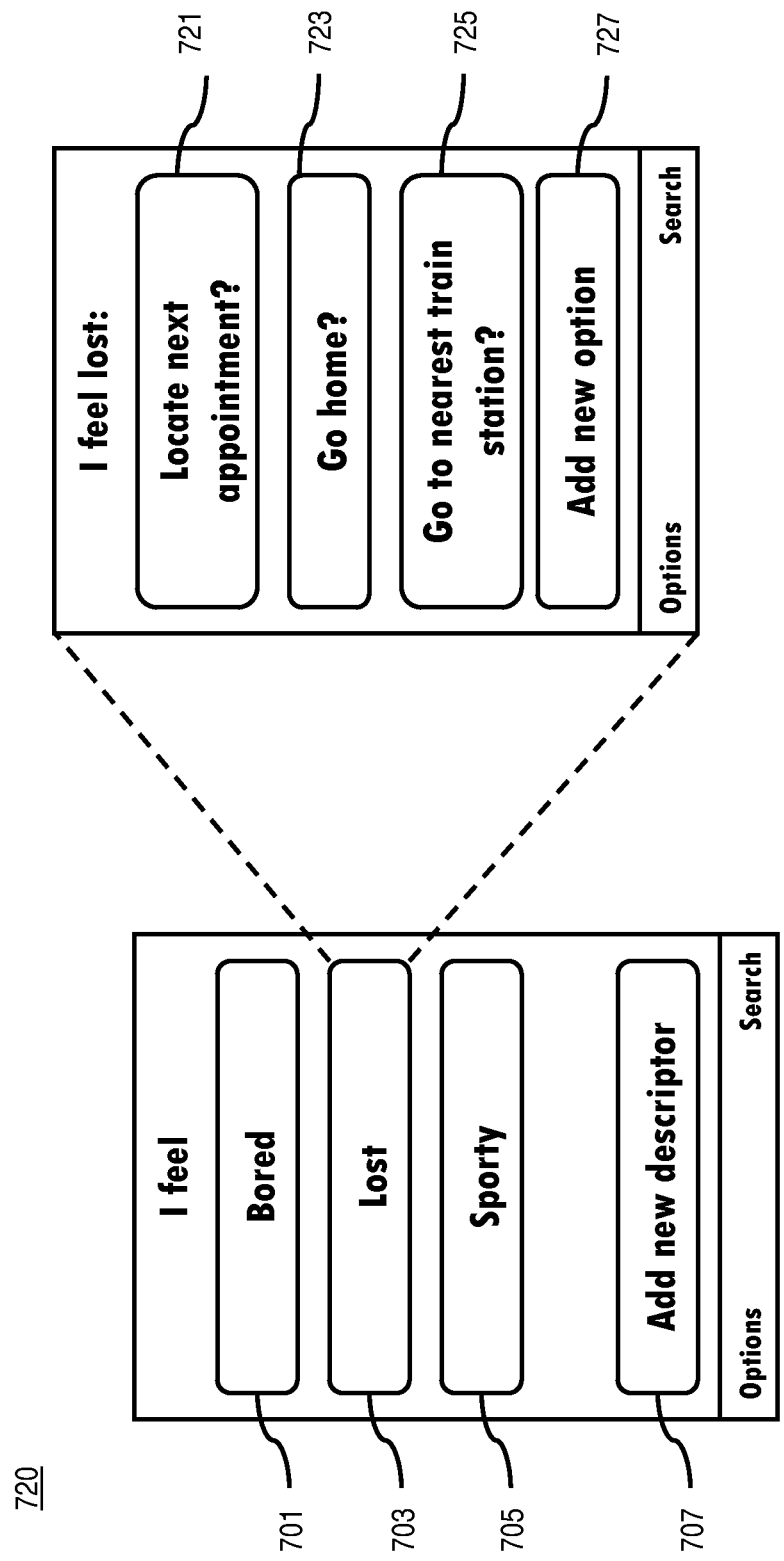

FIG. 7B depicts a use-case scenario in which the user selects a descriptor 703 representing the emotion "lost." User interface 720 presents the same initial descriptors as described with respect to the user interface 700. In this example, the user selects the lost descriptor 703. On selecting the descriptor 703, the user is presented with a set of associated options. These options include option 721 to locate next appointment, option 723 to go home, option 725 to go to nearest train station, and option 727 to add a new option. Option 721 invokes the calendar and navigation applications to determine the location of the user's next appointment and obtain directions to the location. Option 723 invokes the navigation application to obtain directions to the user's home. Option 725 invokes the navigation application to obtain directions to the nearest train station. Option 727 enables the user to customize or specify a new option to associate with the lost descriptor 703.

Figure 7C:
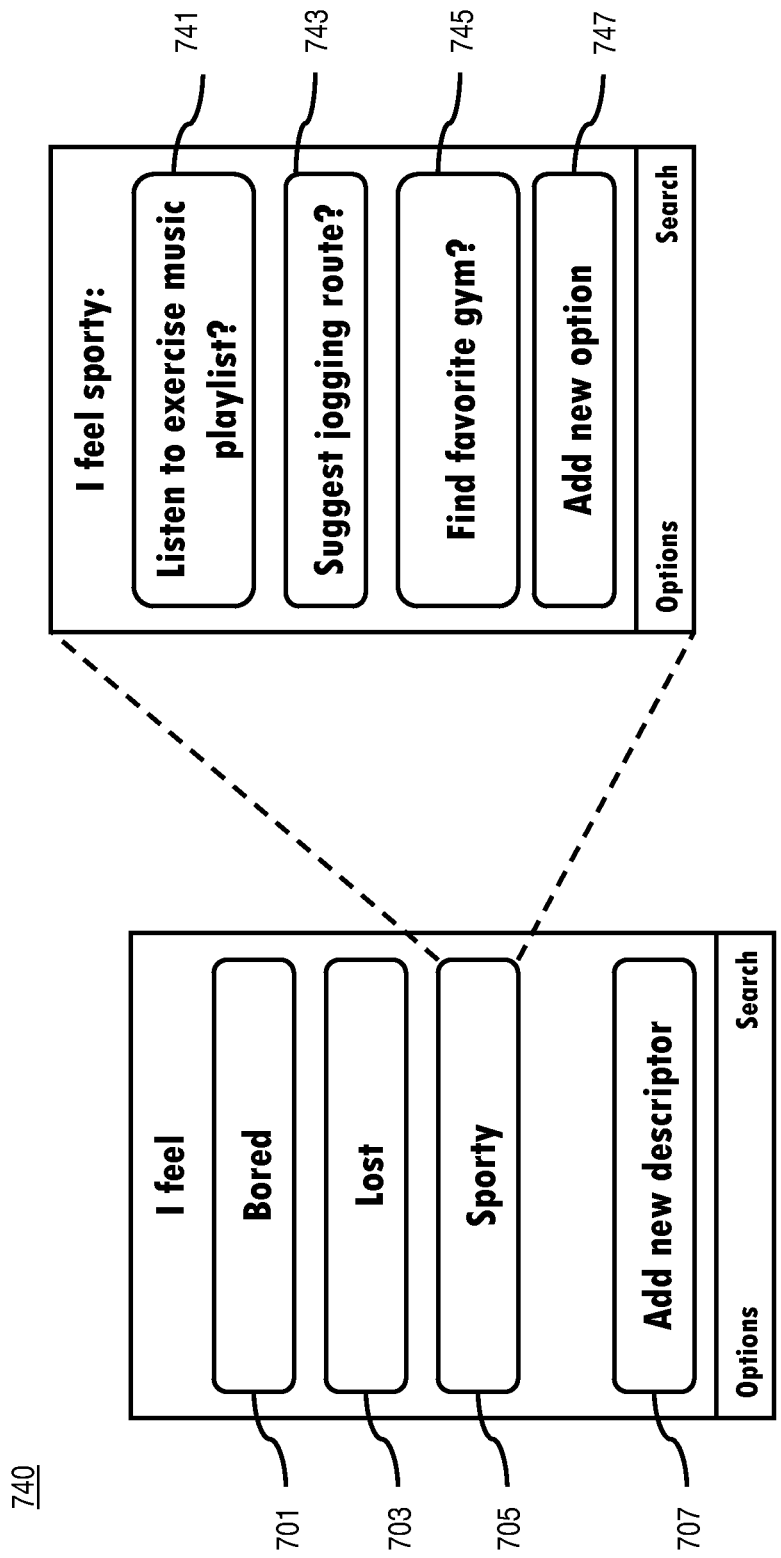

FIG. 7C depicts a use-case scenario in which the user selects a descriptor 705 representing the emotion "sporty." User interface 740 presents the same initial descriptors as described with respect to the user interface 700. In this example, the user selects the sporty descriptor 705. On selecting the descriptor 705, the user is presented with a set of associated options. These options include option 741 to listen to exercise music playlist, option 743 to suggest jogging route, option 745 to find favorite gym, and option 747 to add a new option. Option 741 invokes the music player application to begin playing songs contained in the exercise music playlist. Option 743 invokes a web browser to search for jogging routes and then the navigation application to map the route. Option 745 invokes the contact application to identify the user's favorite gym and then the navigation application to obtain directions to the gym. Option 747 enables the user to customize or specify a new option to associate with the sporty descriptor 705.

Figure 7D:
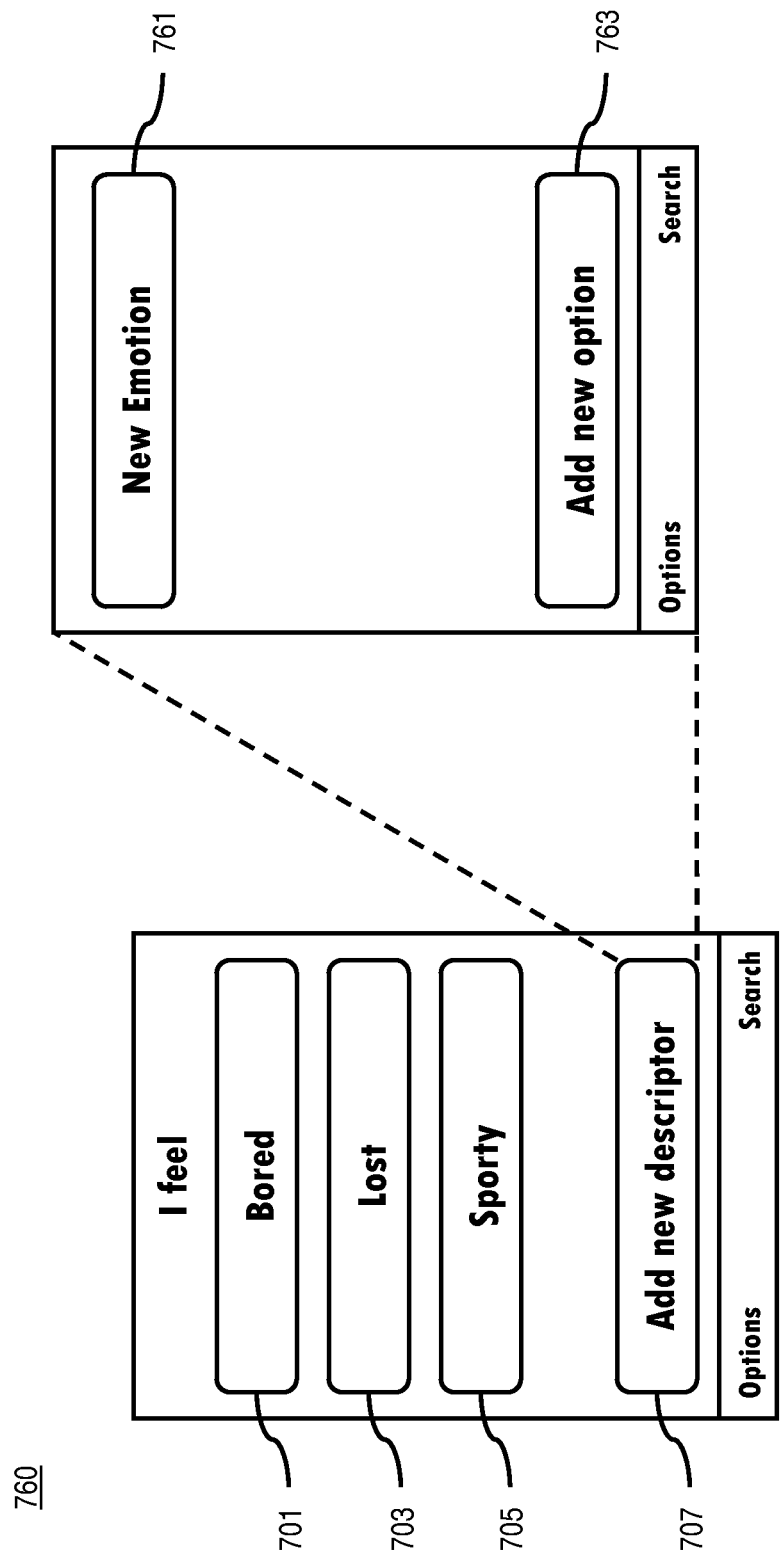

FIG. 7D depicts a use-case scenario in which the user selects to add a new descriptor. User interface 760 presents the same initial descriptors as described with respect to the user interface 700. In this example, the user selects the menu selection 707 to add a new descriptor. In response, the user is presented with an option 761 to identify the new descriptor. By way of example, the user may select option 761 to specify a name for the new descriptor. The user can then select option 763 to specify an option to associate with the new descriptor 761. As discussed previously, the user may specify the option explicitly or the emotion application 107 may learn new options by monitoring the user's actions associated with the new descriptor 761.

Figure 8:
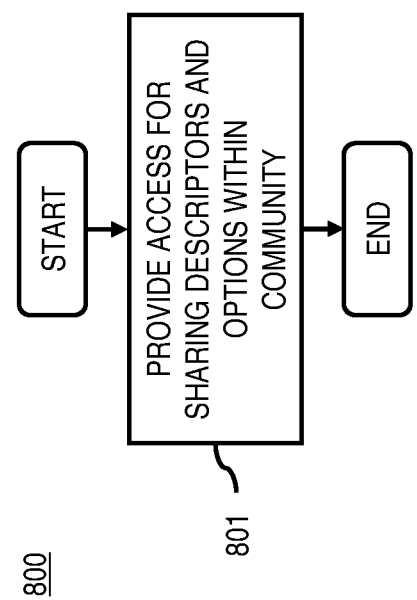
FIG. 8 is a flowchart of a process for sharing descriptors and associated options over a communication network, according to an exemplary embodiment.

FIG. 8 is a flowchart of a process for sharing descriptors and associated options over a communication network, according to an exemplary embodiment. In step 801, the communication network 105 provides access to the emotion sharing platform 103 and/or the emotion application 107 within the UE 101 for creating a community 109 of users and for sharing descriptors and associated options within the community 109. In exemplary embodiments, the communication network 105 may employ, for instance, a social network protocol and/or a peer-to-peer protocol to facilitate the sharing. In addition, it is contemplated that the step of providing access includes allocating sufficient network resources (e.g., bandwidth) to support the sharing. It is also contemplated that the communication network 105 can use any authentication mechanism (e.g., user ID/password, device ID filtering, etc.) to ensure that the emotion sharing platform 103, the emotion application 107, and members of the community 109 are authorized to access the communication network 105.

The processes described herein for providing an emotion-based user interface may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
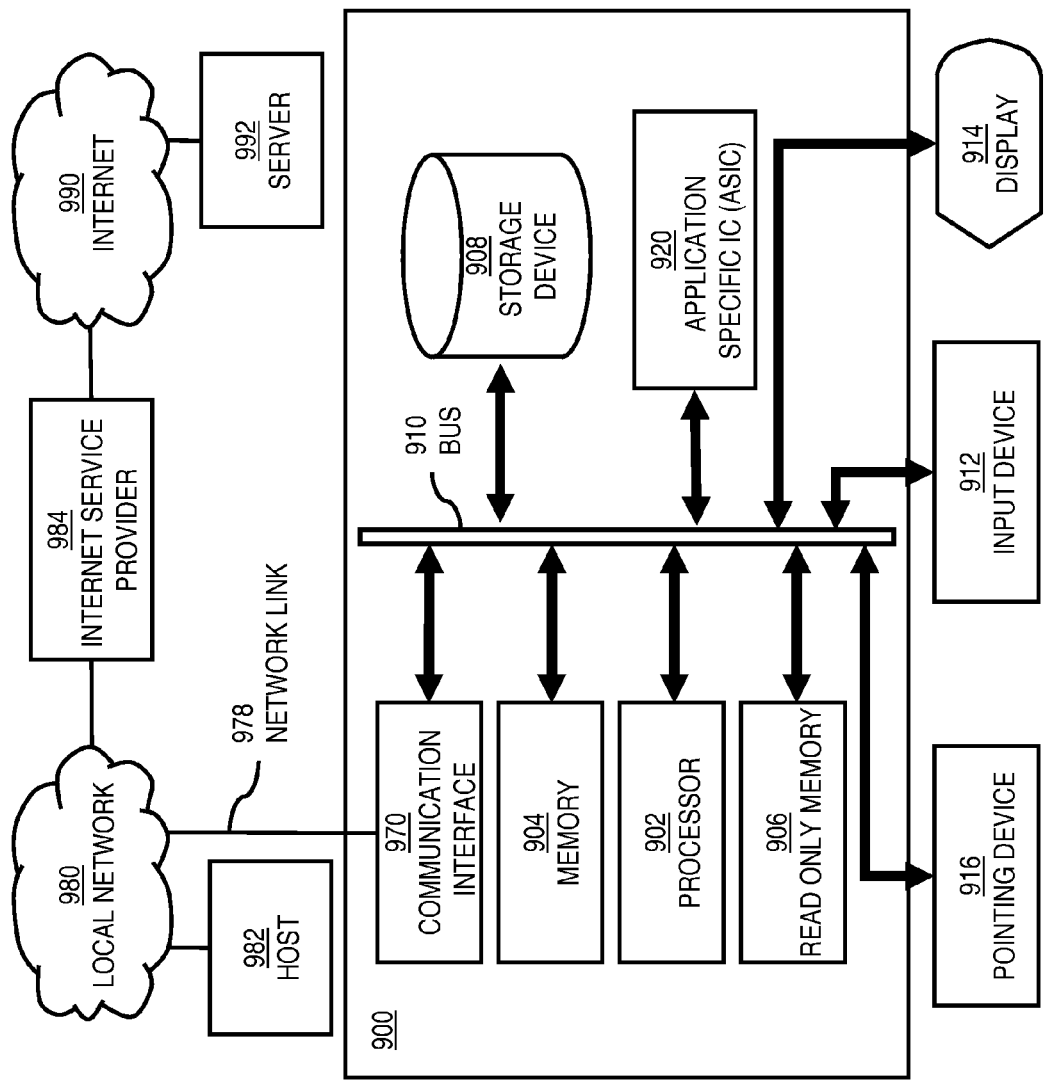
FIG. 9 is a diagram of hardware that can be used to implement an embodiment of the invention.

FIG. 9 illustrates a computer system 900 upon which an embodiment of the invention may be implemented. Computer system 900 is programmed to provide an emotion-based user interface as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information related to providing an emotion-based user interface. The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing an emotion-based user interface. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing an emotion-based interface, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In exemplary embodiments, the communications interface 970 enables connection to the communication network 105 for sharing descriptors 121 and associated options 123 within a community 109 of users and for transferring the descriptors 121 and associated options 123 between a server (e.g., emotion sharing platform 103) or a third party server 111 and the emotion application 107.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide an emotion-based user interface as described herein and includes, for instance, the processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide an emotion-based user interface. The memory 1005 also stores the data associated with or generated by the execution of the inventive steps.

Figure 11:
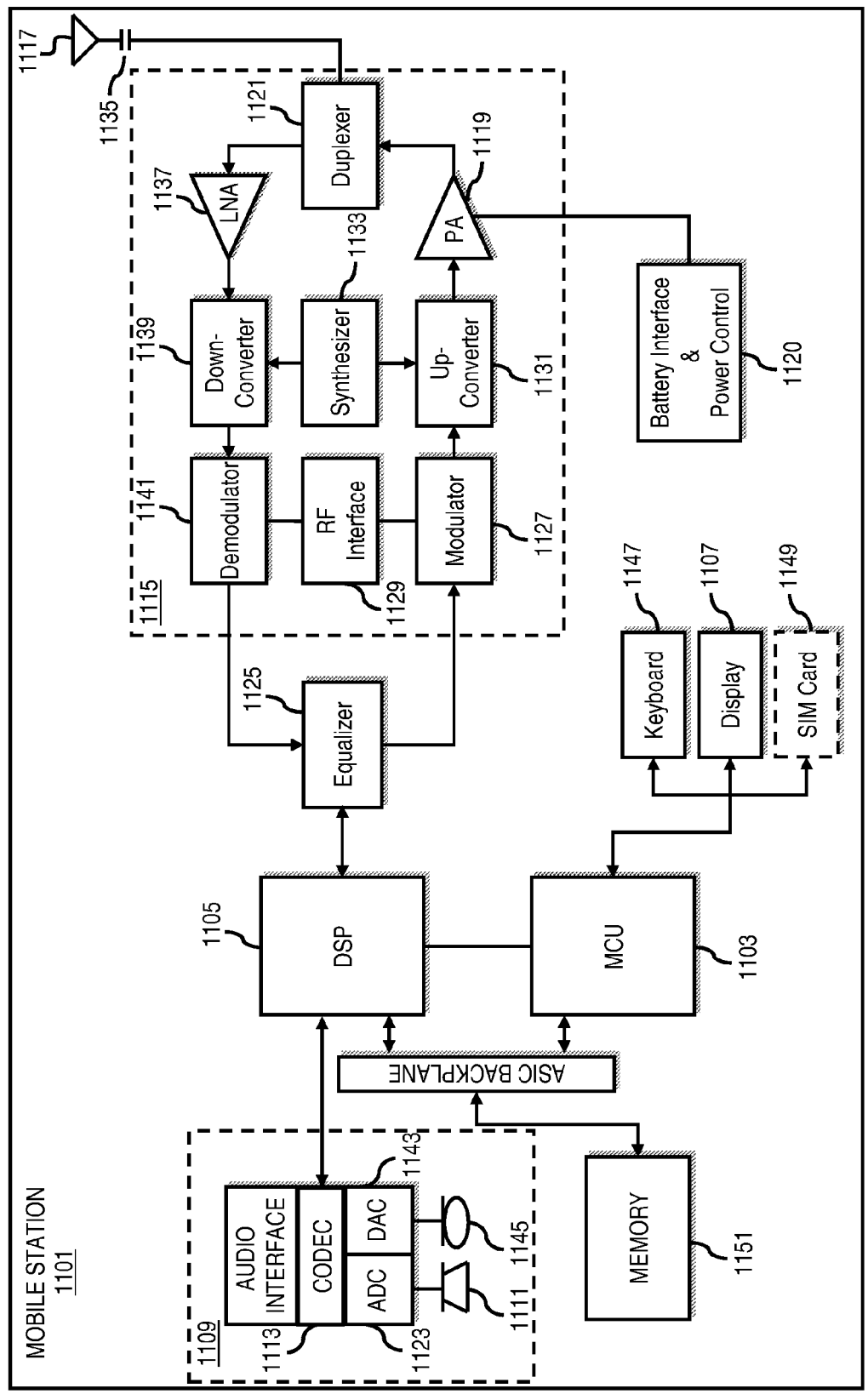
FIG. 11 is a diagram of a mobile station (e.g., handset) that can be used to implement an embodiment of the invention.

FIG. 11 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions such as the emotion application 107. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software facilitate user control of at least come functions of the mobile station 1101 according to an emotion-based user interface. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause the one or more processors to at least perform the following:
   initiating presentation of a plurality of descriptors on a user equipment, wherein each of the descriptors contains one or more words corresponding to an emotion of a user of the user equipment;
   determining an association between one or more options and a selected one of the descriptors without user intervention;
   initiating presentation of the one or more options on the user equipment;
   invoking an application corresponding to a selected one of the options at the user equipment; and
   initiating sharing of one or more of the descriptors and one or more associated options via a peer-to-peer protocol within a community of users.

2. A non-transitory computer-readable storage medium of claim 1, wherein the one or more processors are caused to further perform:
   causing, at least in part, a suggestion of one of the descriptors at the user equipment via monitoring one or more user actions and matching one or more of the monitored user actions against one or more user actions predetermined as associated with one or more of the descriptors, prior to the user selecting the one of the descriptors,
   wherein the options include accessing services, applications, content, or a combination thereof available to the user equipment.

3. A non-transitory computer-readable storage medium of claim 2, wherein the services, applications, content, or a combination thereof include games, media content, personal information management applications, messaging applications, social networking applications, location-aware applications, or a combination thereof, and
   wherein the services, applications, content, or a combination thereof include presentation of visual media content in addition to the descriptors and the options.

4. A non-transitory computer-readable storage medium of claim 1, wherein the one or more processors are caused to further perform:
   monitoring one or more actions of the user on the user equipment occurring after selecting the selected one of the descriptors to learn the association.

5. A non-transitory computer-readable storage medium of claim 1, wherein the one or more processors are caused to further perform:
   initiating creation of a new descriptor and associated options or update of an existing one of the descriptor and the one or more associated options by either receiving input from the user or monitoring actions of the user on the user equipment.

6. A non-transitory computer-readable storage medium of claim 1, wherein the one or more processors are caused to further perform:
   initiating downloading of one or more of the descriptors and associated options from a community of users, a server, or a third party server.

7. An apparatus comprising:
   at least one processor; and
   at least one memory including computer program code for one or more programs,
   the at least one memory and the computer program code configured to, with the at least one processor, cause the apparatus to perform at least the following,
   initiate presentation of a plurality of descriptors on a user equipment, wherein each of the descriptors contains one or more words corresponding to an emotion of a user of the user equipment;
   determining an association between one or more options and a selected one of the descriptors without user intervention;
   initiate presentation of the one or more options on the user equipment;
   invoke an application corresponding to a selected one of the options at the user equipment; and
   initiate sharing of one or more of the descriptors and one or more associated options via a peer-to-peer protocol within a community of users.

8. An apparatus of claim 7, wherein the apparatus is further caused to:
   cause, at least in part, a suggestion of one of the descriptors at the user equipment via monitoring one or more user actions and matching one or more of the monitored user actions against one or more user actions predetermined as associated with one or more of the descriptors, prior to the user selecting the one of the descriptors,
   wherein the options include accessing services, applications, content, or a combination thereof available to the user equipment.

9. An apparatus of claim 8, wherein the services, applications, content, or a combination thereof include games, media content, personal information management applications, messaging applications, social networking applications, location-aware applications, or a combination thereof, and
   wherein the services, applications, content, or a combination thereof include presentation of visual media content in addition to the descriptors and the options.

10. An apparatus of claim 7, wherein the apparatus is further caused to:
    monitor one or more actions of the user on the user equipment occurring after selecting the selected one of the descriptors to learn the association.

11. An apparatus of claim 7, wherein the apparatus is further caused to:
    initiate creation of a new descriptor and associated options or update of an existing one of the descriptors and the one or more associated options by either receiving input from the user or monitoring actions of the user on the user equipment.

12. An apparatus of claim 7, wherein the apparatus is further caused to:
    initiate downloading of one or more of the descriptors and associated options from a community of users, a server, or a third party server.

13. An apparatus of claim 7, wherein the apparatus is a mobile phone further comprising:
    user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

14. An apparatus of claim 13, wherein the mobile phone is pre-loaded with one or more of the descriptors and associated actions.

15. An apparatus of claim 7, wherein the apparatus is further caused to:
receive an input, from the user, for creating or joining a community of users;
initiate creation of the community or addition of the user to the community based on the input; and
initiate sharing of one or more of the descriptors and associated options within the community.

16. A method comprising:
initiating, by a processor, presentation of a plurality of descriptors on a user equipment, wherein each of the descriptors contains one or more words corresponding to an emotion of a user of the user equipment;
determining an association between one or more options and a selected one of the descriptors without user intervention;
initiating presentation of the one or more options on the user equipment;
invoking an application corresponding to a selected one of the options at the user equipment; and
initiating sharing of one or more of the descriptors and one or more associated options via a peer-to-peer protocol within a community of users.

17. A method of claim 16, further comprising:
causing, at least in part, a suggestion of one of the descriptors on the user equipment via monitoring one or more user actions and matching one or more of the monitored user actions against one or more user actions predetermined as associated with one or more of the descriptors, prior to the user selecting the one of the descriptors,
wherein the options include accessing services, applications, or content available to the user equipment.

18. An apparatus of claim 15, wherein the shared options include accessing services, applications, or content available to the user equipment.

19. A method of claim 17, wherein the services, applications, content, or a combination thereof include games, media content, personal information management applications, messaging applications, social networking applications, location-aware applications, or a combination thereof, and
wherein the services, applications, content, or a combination thereof include presentation of visual media content in addition to the descriptors and the options.

* * * * *